(12) United States Patent
Yoon et al.

(10) Patent No.: US 8,862,065 B2
(45) Date of Patent: Oct. 14, 2014

(54) APPARATUS AND METHOD FOR FREQUENCY OFFSET ESTIMATION IN MOBILE COMMUNICATION SYSTEM

(75) Inventors: Yon-Woo Yoon, Daejeon (KR); Keun-Chul Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 13/080,751

(22) Filed: Apr. 6, 2011

(65) Prior Publication Data

US 2011/0244807 A1    Oct. 6, 2011

(30) Foreign Application Priority Data

Apr. 6, 2010    (KR) .................. 10-2010-0031447

(51) Int. Cl.
| | |
|---|---|
| *H04B 17/00* | (2006.01) |
| *H04B 17/02* | (2006.01) |
| *H04B 1/18* | (2006.01) |
| *H04L 27/26* | (2006.01) |
| *H04W 56/00* | (2009.01) |

(52) U.S. Cl.
CPC ....... *H04W 56/0035* (2013.01); *H04L 27/2675* (2013.01); *H04L 27/2657* (2013.01)
USPC ............... 455/67.11; 455/139; 455/192.1

(58) Field of Classification Search
CPC ............. H04B 17/004; H04B 17/0062; H04B 17/0067; H04W 56/0035
USPC ........... 455/39, 62, 67.11, 68, 703, 136, 139, 455/164.1, 173.1, 182.1, 192.1, 316
See application file for complete search history.

(56) References Cited

U.S. PATENT DOCUMENTS

| | | | |
|---|---|---|---|
| 7,167,508 B2 * | 1/2007 | Lin | 375/148 |
| 7,990,929 B2 * | 8/2011 | McPherson | 370/335 |
| 2002/0045433 A1 * | 4/2002 | Vihriala | 455/313 |
| 2004/0156422 A1 * | 8/2004 | Liljestrom | 375/148 |
| 2006/0140257 A1 * | 6/2006 | Liu | 375/148 |
| 2007/0030927 A1 * | 2/2007 | Jard et al. | 375/340 |
| 2007/0133611 A1 * | 6/2007 | Li et al. | 370/503 |
| 2007/0275674 A1 * | 11/2007 | Chien | 455/90.2 |
| 2008/0101496 A1 * | 5/2008 | Gaikwad | 375/267 |
| 2008/0240310 A1 * | 10/2008 | Zheng et al. | 375/344 |
| 2009/0003493 A1 * | 1/2009 | Gunturi et al. | 375/344 |
| 2011/0135041 A1 * | 6/2011 | Ezaki et al. | 375/341 |
| 2011/0311005 A1 * | 12/2011 | Andgart et al. | 375/344 |
| 2012/0183101 A1 * | 7/2012 | Murakami et al. | 375/324 |

* cited by examiner

*Primary Examiner* — Andrew Wendell (57) ABSTRACT

A method and apparatus estimate a frequency offset of a receiver in a mobile communication system. A pilot signal and a signal of a control channel are received from a transmitter. Frequency offsets of the pilot signal and frequency offsets of the control channel are estimated, respectively. And the frequency offset of the pilot signal is corrected based on the frequency offset estimation of the control channel.

20 Claims, 7 Drawing Sheets

APPARATUS AND METHOD FOR FREQUENCY OFFSET ESTIMATION IN MOBILE COMMUNICATION SYSTEM

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Apr. 6, 2010, and assigned Serial No 10-2010-0031447, the entire disclosure of which is hereby incorporated by reference.

TECHNICAL FIELD OF THE INVENTION

The present invention relates to an apparatus and a method for correcting a frequency offset in a base station of a mobile communication system.

BACKGROUND OF THE INVENTION

A frequency offset occurring in a mobile communication system includes two types. One is the frequency offset generated by a Carrier Frequency Offset (CFO) between a terminal and a base station, and the other is the frequency offset caused by Doppler frequency.

The terminal synchronizes with a transmit carrier frequency of the base station through initial ranging or periodic ranging. When the terminal cannot achieve an accurate synchronization or when the accurate synchronization is compromised by movement of the terminal, a frequency offset takes place. Also, when the terminal transmits signals during the fast movement, the Doppler frequency can cause a frequency offset.

Such a frequency offset increases channel change with time of the received signal, grows channel estimation error, and degrades an overall performance of the whole modem.

When the terminal synchronizes and transmits with the carrier frequency including the frequency offset in the downlink, the frequency offset of a base station modem is double a maximum Doppler frequency.

An estimation range using a pilot signal of a Physical Resource Unit (PRU) is determined by how many symbols a pair of pilots of the same subcarrier are separated from each other in the time domain. Disadvantageously, the estimation range cannot cover a maximum range of the frequency offset occurrence.

In addition, when the terminal is traveling fast, it is hard to estimate the frequency offset merely with the pilot signal.

SUMMARY OF THE INVENTION

To address the above-discussed deficiencies of the prior art, it is a primary aspect of the present invention to provide an apparatus and a method for estimating a frequency offset in a mobile communication system.

Another aspect of the present invention is to provide an apparatus and a method for estimating a frequency offset using a pilot signal and a signal of a control channel in a mobile communication system.

According to one aspect of the present invention, a method for estimating a frequency offset of a receiver in a mobile communication system is provided. A pilot signal and a signal of a control channel are received from a transmitter. Frequency offsets of the pilot signal and frequency offsets of the control channel are estimated, respectively. And the frequency offset of the pilot signal is corrected based on the frequency offset estimation of the control channel.

According to another aspect of the present invention, an apparatus of a receiver for estimating a frequency offset in a mobile communication system is provided. The apparatus includes a reception circuit, a pilot signal phase determiner, a control channel phase determiner, and a merger. The reception circuit receives a pilot signal and a signal of a control channel from a transmitter. The pilot signal phase determiner estimates frequency offsets of the pilot signal. The control channel phase determiner estimates frequency offsets of the control channel. And the merger corrects the frequency offset of the pilot signal based on the frequency offset estimation of the control channel.

According to yet another aspect of the present invention, an apparatus of a receiver for estimating a frequency offset in a mobile communication system is provided. The apparatus includes a receiver circuit, a phase determiner, and a merger. The receiver circuit receives a pilot signal and a signal of a control channel. The phase determiner estimates frequency offsets of the pilot signal and the control channel, respectively. And the merger corrects the frequency offset of the pilot signal based on the frequency offset estimation of the control channel.

Other aspects, advantages, and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile communication system.

Embodiments of the present invention provide an apparatus and a method for estimating a frequency offset in a mobile communication system.

The present invention estimates the frequency offset using a Primary Fast feedback Channel (P-FBCH) of the great reliability among control channels, and a pilot signal of a Physical Resource Unit (PRU) allocated to a terminal.

The present invention corrects the frequency offset of the pilot signal by determining, using the control channel, whether and, if any, which way the frequency offset of the pilot signal exceeds an estimation range.

The present invention estimates the frequency offset using the pilot signal or the P-FBCH respectively and determines the ultimate frequency offset by combining the frequency offsets.

The frequency offset may be estimated using a pilot signal carried by different symbols of the same subcarrier. The frequency offset estimation utilizes a pilot signal pair of the same subcarrier. An average of phase difference is determined using correlation of the pilot signal pair, and the frequency offset is estimated from the average phase.

A terminal synchronizes a carrier frequency offset of a base station within an allowable range of the system through ranging. When the carrier frequency offset is synchronized within 2% of a subcarrier spacing (10.937 kHz), the maximum carrier frequency offset is 218.74 Hz. When a center frequency is 2.5 GHz and the terminal travels at the speed of 350 Km/h, the maximum Doppler frequency is 810.2 Hz.

Figure 1:
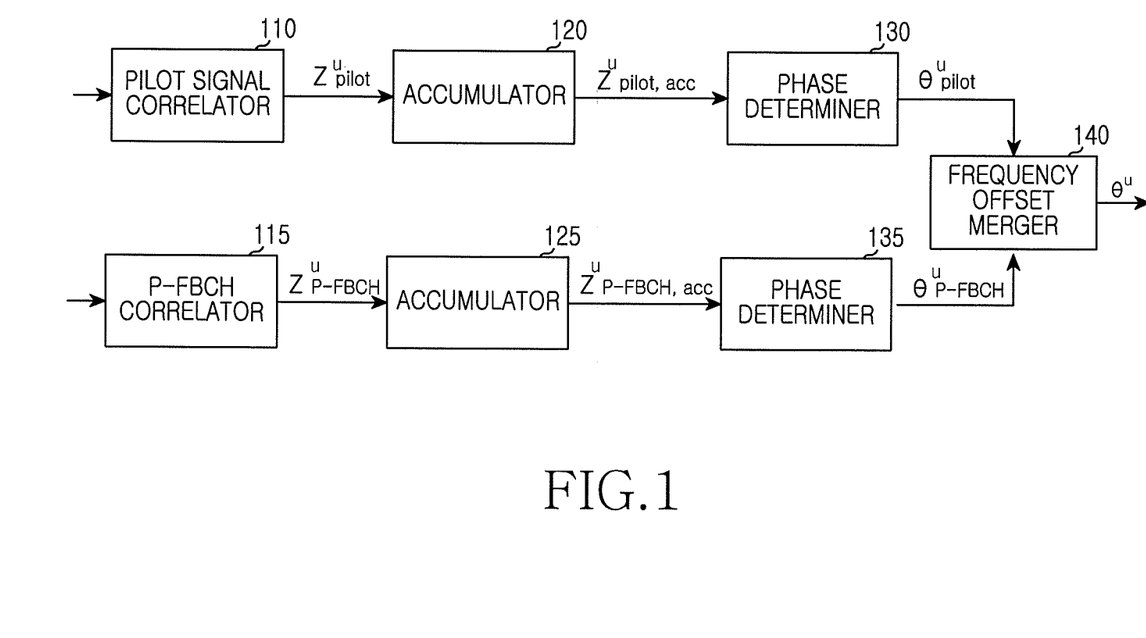
FIG. 1 illustrates simplified blocks for estimating a frequency offset according to an embodiment of the present invention.

FIG. 1 is a simplified block diagram of an apparatus for estimating a frequency offset according to an embodiment of the present invention.

The apparatus for estimating the frequency offset in FIG. 1 includes a pilot signal correlator 110, a P-FBCH correlator 115, accumulators 120 and 125, phase determiners 130 and 135, and a frequency offset merger 140.

The pilot signal correlator 110 performs correlation to estimate the frequency offset from a phase difference according to a time difference in the pilot signal of the PRU. It should be appreciated that a reception circuit including a receive antenna and a Radio Frequency (RF) circuit receives the pilot signal and the signal of the P-FBCH.

Figure 2:
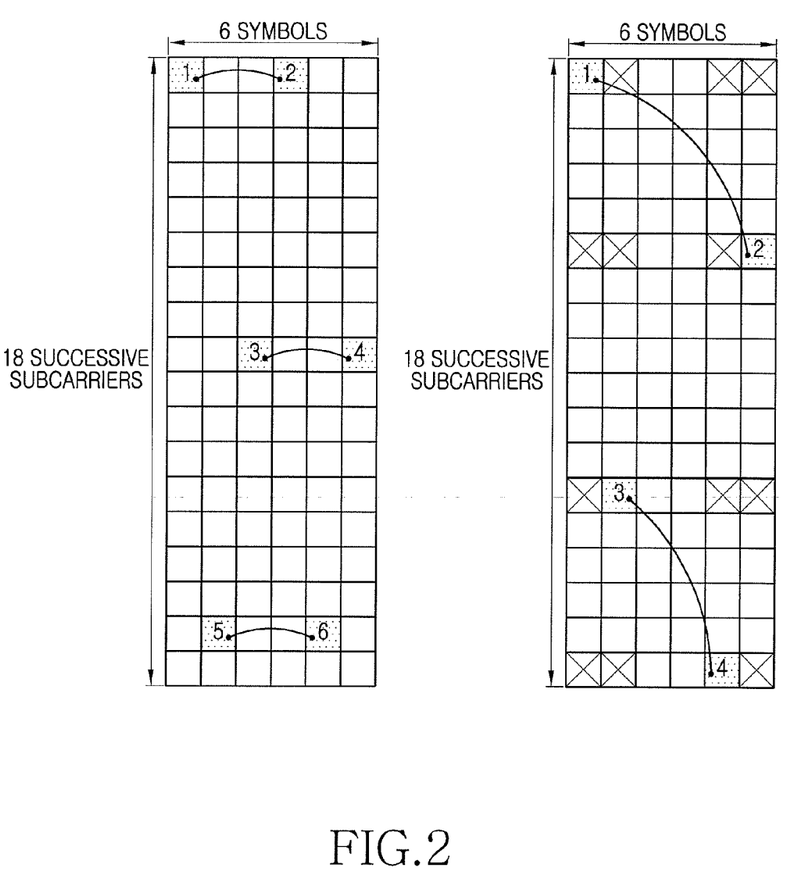
FIG. 2 illustrates pilot correlation pairs according to an embodiment of the present invention.

In every PRU received at the reception circuit and allocated to the terminal, the pilot signal of the stream corresponding to the terminal is used. The pilot correlation pairs, according to an embodiment, of the present invention are illustrated in FIG. 2. FIG. 2 illustrates Contiguous Resource Unit (CRU) 1Tx and CRU 4Tx.

Provided that the channel LS estimation of the pilot tone received via the receive antenna r for the terminal u is $\hat{H}_{LS}^{r}[l_i^p, k_i^p]$, the correlation of the pilot signal in the same subcarrier is expressed by Equation 1.

$$Z_{pilot}^{r,u} = \sum_{n=1}^{uth\ user's\ PRU} \sum_{i=1}^{N_p/2} \hat{H}_{LS}^{n,r}[l_{2i}^p, k_{2i}^p]\left(\hat{H}_{LS}^{n,r}[l_{2i-1}^p, k_{2i-1}^p]\right)^* \quad [\text{Eqn. 1}]$$

In Equation 1, n denotes the number of PRUs allocated to the terminal u, and N denotes the number of pilot tones of the PRU. l denotes a symbol index and k denotes a subcarrier index. i is an index of the pilot pair. p denotes pilot tone. $\hat{H}_{LS}^{n,r}[l_{2i}^p, k_{2i}^p]$ denotes channel LS estimate at p. Because the symbol differences of the pilot signal (1, 2) and the pilot signal (3, 4) are different from each other, the results using them are averaged.

The frequency offset acquired based on Equation 1 is $\theta_{pilot}^{r,u} = \angle Z_{pilot}^{r,u}/\Delta l$, where $\Delta l$ denotes the spacing of the pilot tone pair of the same subcarrier.

Figure 3:
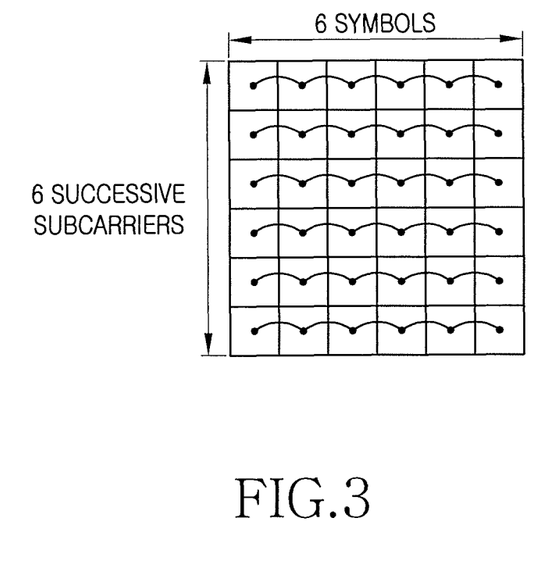
FIG. 3 illustrates P-FBCH signal correlation pairs according to an embodiment of the present invention.

The P-FBCH correlator 115 performs the correlation to estimate the frequency offset from the P-FBCH signal including three distributed 2×6 Frequency Mask Trigger (FMT) received from the terminal as illustrated in Table 1. The P-FBCH signal correlation pairs are illustrated in FIG. 3.

TABLE 1

| Index | Sequence |
| --- | --- |
| 0 | 111111111111 |
| 1 | 101111010110 |
| 2 | 011010111101 |
| 3 | 001010010100 |
| 4 | 101010101010 |
| 5 | 111010000011 |
| 6 | 001111101000 |
| 7 | 011111000001 |
| 8 | 110011001100 |
| 9 | 100011100101 |
| 10 | 010110001110 |
| 11 | 000110100111 |
| 12 | 100110011001 |
| 13 | 110110110000 |
| 14 | 000011011011 |
| 15 | 010011110010 |
| 16 | 101011111100 |
| 17 | 111011010101 |
| 18 | 001110111110 |
| 19 | 011110010111 |
| 20 | 111110101001 |
| 21 | 101110000000 |
| 22 | 011011101011 |
| 23 | 001011000010 |
| 24 | 100111001111 |
| 25 | 110111100110 |
| 26 | 000010001101 |
| 27 | 010010100100 |
| 28 | 110010011010 |
| 29 | 100010110011 |
| 30 | 010111011000 |
| 31 | 000111110001 |
| 32 | 101011001001 |
| 33 | 111011100000 |
| 34 | 001110001011 |
| 35 | 011110010110 |
| 36 | 100111111010 |
| 37 | 110111010011 |
| 38 | 000010111000 |
| 39 | 010010010001 |

TABLE 1-continued

| Index | Sequence |
|---|---|
| 40 | 111110011100 |
| 41 | 101110110101 |
| 42 | 011011011110 |
| 43 | 001011110111 |
| 44 | 101010011111 |
| 45 | 111010101110 |
| 46 | 001111011101 |
| 47 | 011111110100 |
| 48 | 111111001010 |
| 49 | 101111100011 |
| 50 | 011010001000 |
| 51 | 001010100001 |
| 52 | 110010101111 |
| 53 | 100010000110 |
| 54 | 010111101101 |
| 55 | 000111000100 |
| 56 | 100110101100 |
| 57 | 110110000101 |
| 58 | 000011101110 |
| 59 | 010011000111 |
| 60 | 110011111001 |
| 61 | 100011010000 |
| 62 | 010110111011 |
| 63 | 000110010010 |

Table 1 arranges permutations of the P-FBCH, which are pre-stored to the base station and the terminal. Upon detecting the corresponding index, the base station carries out the correlation to estimate the frequency offset using the corresponding sequence which is regarded as the pilot signal. Herein, the correlation between the received signals, which are different by one symbol, is calculated according to Equation 2.

$$Z_{PFBCH}^{r,u} = \sum_{k=0}^{6} \sum_{l=1}^{5} \frac{Y_{l,k}^{u,r}}{X_{l,k}^{u}} \left( \frac{Y_{l-1,k}^{u,r}}{X_{l-1,k}^{u}} \right)^*$$ [Eqn. 2]

In Equation 2, the signal is received from the terminal u via the receive antenna r. The P-FBCH signal is $Y_{l,k}^{u,r}$ and the detected symbol is $X_{l,k}^{u}$.

When the receive Carrier to Interference plus Noise Ratio (CINR) is low, when the detection error of the P-FBCH takes place, or when the frequency offset estimation accuracy is to be raised, the accumulators 130 and 135 accumulate the outputs $Z_{pilot}^{r,u}$ and $Z_{PFBCH}^{r,u}$ of the correlators 110 and 115 based on Equation 3.

$$Z_{Pilot,acc}^{r,u}(t_1) = \beta_1 \cdot Z_{Pilot,acc}^{r,u}(t_1-1) + Z_{Pilot}^{r,u}$$

$$Z_{PFBCH,acc}^{r,u}(t_2) = \beta_2 \cdot Z_{PFBCH,acc}^{r,u}(t_2-1) + Z_{PFBCH}^{r,u}$$ [Eqn. 3]

The accumulators 120 and 125 may reflect the frequency offset change on the time basis using a weighted sum. Herein, the accumulators 120 and 125 are used to enhance the estimation performance. The frequency offset does not change considerably within a short time. Yet, when the estimated value is accumulated, the estimation performance can be improved. However, the weighted sum is adopted to reflect the change of the correlation value on the time basis. The small weight is set for the old estimation value, and the great weight is set for the recent estimation value. The standard for determining the recent estimation value and the old estimation value may vary according to an implementation situation, a manufacturer, or an operator.

Herein, $\beta_1$ and $\beta_2$ are values relating to the weight of the estimation value (normalization is used to prevent the value from increasing during the continuous accumulation). $\beta_1$ and $\beta_2$ are determined in accordance with various conditions such as channel change and terminal speed.

To estimate the frequency offset, the phase determiners 130 and 135 determine the phase of the accumulated values of the accumulators 120 and 125 based on Equation 4.

$$\theta_{pilot}^{r,u} = \frac{\angle Z_{pilot,acc}^{r,u}}{\Delta l}$$ [Eqn. 4]

$$\theta_{PFBCH}^{r,u} = \angle Z_{PFBCH,acc}^{r,u}$$

$\Delta l$ denotes the spacing of the pilot tone pair of the same subcarrier.

Next, the frequency offset merger 140 determines the frequency offset as follows.

The phase calculation using the pilot signal is updated in every subframe and is relatively more accurate than using the P-FBCH, whereas its frequency offset estimation range is limited.

Hence, the frequency offset is corrected by determining whether it exceeds the estimation range using the phase acquired from the P-FBCH. An indicator of whether the frequency offset falls out of the estimation range is given by Equation 5.

$$v^{r,u} = \text{round}\left( (\theta_{PFBCH}^{r,u} - \theta_{Pilot}^{r,u}) \frac{\Delta l}{2\pi} \right)$$ [Eqn. 5]

In Equation 5, round( ) a rounding function and $v^{r,u}$ has the value of '−1', '0' or '1'. When the estimation value of the P-FBCH exceeds the estimation range using the pilot signal, $v^{r,u}$ is set to '1'. When the estimation value falls below the estimation range, $v^{r,u}$ is set to '−1'.

That is, the value for making the estimation value using the pilot signal approach the estimation value using the P-FBCH most is selected. Accordingly, the rough range relies on the estimation value using the P-FBCH, and the fine range relies on the estimation value using the pilot signal.

With $v^{r,u}$ and $\theta_{pilot}^{r,u}$, the ultimate frequency offset is given by Equation 6.

$$\theta_{freq}^{r,u} = \theta_{Pilot}^{r,u} + v^{r,u} \frac{2\pi}{\Delta l}$$ [Eqn. 6]

In Equation 6, $\Delta l$ denotes the pilot symbol spacing as illustrated in Table 2. When traffic data transmission of a user is faster than the P-FBCH transmission, $v^{r,u}$ is set to zero.

TABLE 2

| PRU Type | Number of transmission stream | Subframe Type | Estimation Range | Pilot symbol Spacing |
|---|---|---|---|---|
| CRU | 1Tx, 2Tx | Type-1 | −1620~1620 Hz | 3 |
|  |  | Type-2 | −1620~1620 Hz | 3 |
|  |  | Type-3 | −1620~1620 Hz | 3 |
|  | 3Tx, 4Tx | Type-1 | −1620~1620 Hz −972~972 Hz | 3.5 |
|  |  | Type-2 | −2430~2430 Hz −1215~1215 Hz | 2.4 |
|  |  | Type-3 | −1620~1620 Hz −972~972 Hz | 3.5 |
| DRU | 1Tx, 2Tx | Type-1 | −1215~1215 Hz | 4 |
|  |  | Type-2 | −1215~1215 Hz | 4 |
|  |  | Type-3 | −1620~1620 Hz | 3 |

Table 2 arranges the frequency offset estimation range (based on CP ratio of 1/8) and the pilot symbol spacing.

Figure 4A:
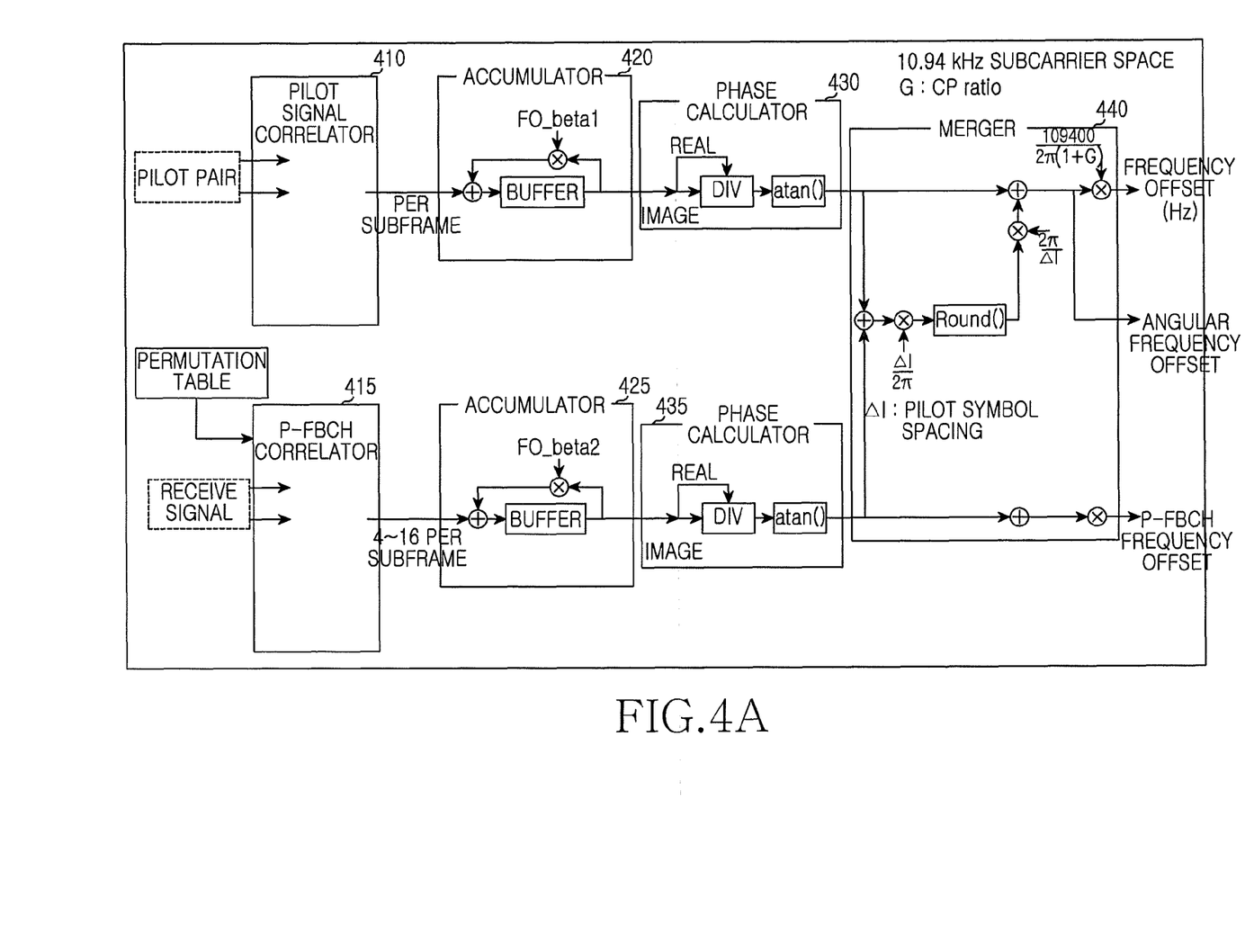
FIG. 4A illustrates detailed blocks for estimating the frequency offset according to an embodiment of the present invention.
Figure 4B:
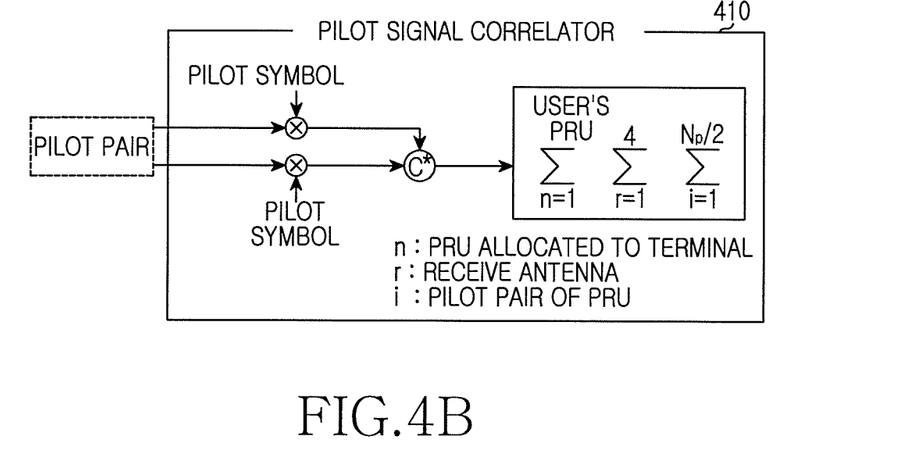
FIG. 4B illustrates detailed blocks for pilot signal correlator of the detailed blocks for the estimating the frequency offset according to an embodiment of the present invention.
Figure 4C:
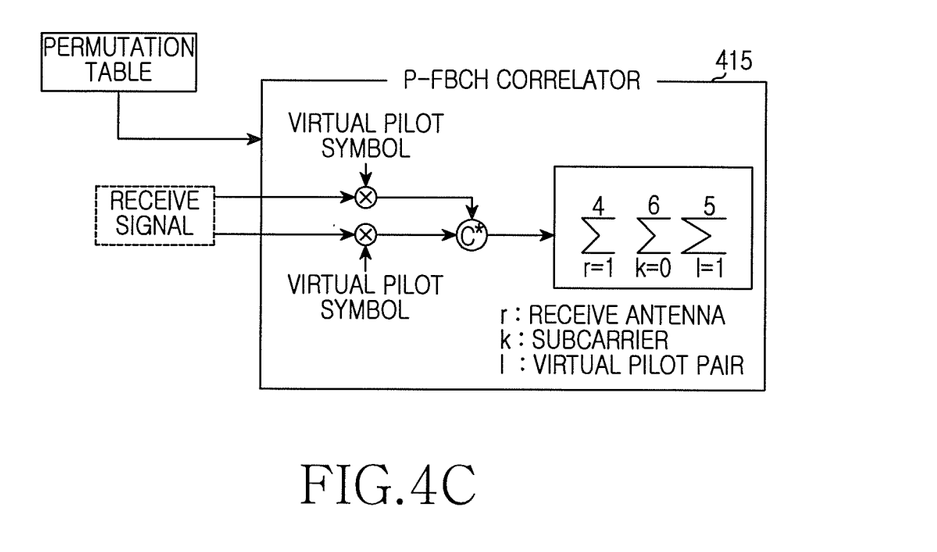
FIG. 4C illustrates detailed blocks for P-FBCH correlator of the detailed blocks for the estimating the frequency offset according to an embodiment of the present invention.

FIG. 4A illustrates detailed blocks for estimating the frequency offset according to an embodiment of the present invention, FIG. 4B illustrates detailed blocks for a pilot signal correlator according to an embodiment of the present invention, and FIG. 4C illustrates detailed blocks for a P-FBCH correlator according to an embodiment of the present invention.

The pilot signal correlator 410 determines the correlation value to estimate the frequency offset caused by the phase difference according to the time difference for the pilot signal of the PRU on the time basis in every subframe. Herein, the pilot signal of the stream corresponding to the terminal from every PRU received via the receive antenna and allocated to the terminal is used. The pair of the pilot signals is input to the pilot signal correlator 410, the correlation is performed on the pilot signals, and the average of the pilot signals is determined in every subframe.

The P-FBCH correlator 415 determines the correlation value to estimate the frequency offset for the P-FBCH signal including the three distributed 2×6 FMT received from the terminal. The P-FBCH signal is the permutation of Table 1 and pre-stored to the base station and the terminal. When detecting the corresponding index, the base station determines the correlation value using the corresponding sequence as the pilot. A virtual pilot symbol indicates the permutation. The pair of the P-FBCH signals are input to the P-FBCH correlator 415, the correlation is applied to the P-FBCH signals, and the average of the correlation values is determined in every 4-16 subframes.

When the receive CINR is low, when the detection error of the P-FBCH takes place, or when the frequency offset estimation accuracy is to be raised, the accumulators 420 and 425 accumulate the outputs $Z_{pilot}^{r,u}$ and $Z_{PFBCH}^{r,u}$ of the correlators 410 and 415, respectively. Herein, the accumulators 420 and 425 may reflect the frequency offset change on the time basis using the weighted sum.

The frequency offset does not change greatly within a short time. Yet, when the estimated value is accumulated, the estimation performance may be improved. However, the weighted sum is adopted to reflect the change of the correlation value on the time basis. The small weight is set for the old estimation value, and the great weight is set for the recent estimation value. FO_beta1 and FO_beta2 are values relating to the weight of the estimation value (the normalization is used to prevent the value from increasing during the continuous accumulation). FO_beta1 and FO_beta2 are determined in accordance with various conditions such as channel change and terminal speed.

The phase determiners 430 and 435 determine and output the phase of the accumulated value of the accumulators 420 and 425.

Next, the merger 440 estimates the frequency offset. The phase calculation using the pilot signal is updated in every subframe and is relatively more accurate than using the P-FBCH, whereas its frequency offset estimation range is limited. Hence, the frequency offset is corrected by determining whether it exceeds the estimation range using the phase acquired from the P-FBCH. The indicator of whether the frequency offset falls out of the estimation range uses the rounding function round( ) of Equation 5. The output from the merger 440 includes three types; that is, the determined frequency offset, a radian frequency offset, and the P-FBCH frequency offset. The radian frequency offset represents the frequency offset with the radian.

Figure 5:
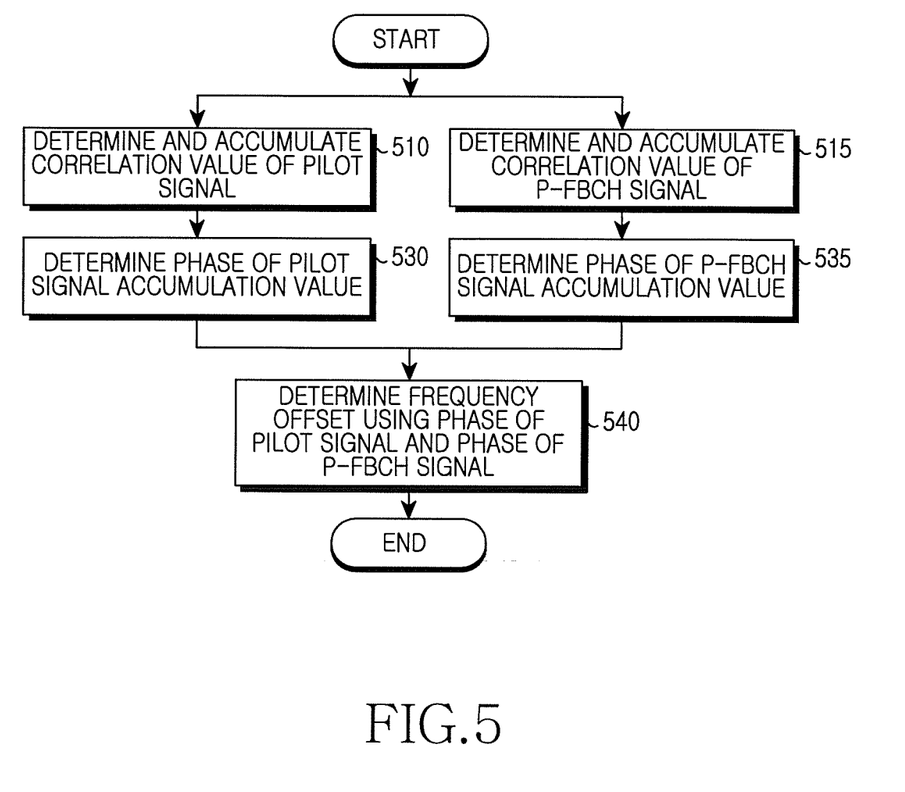
FIG. 5 illustrates a process for estimating the frequency offset according to an exemplary embodiment of the present invention.

FIG. 5 illustrates a process for estimating the frequency offset according to an embodiment of the present invention.

In block 501, the pilot signal correlator determines the correlation value to estimate the frequency offset caused by the phase difference according to the time difference with respect to the pilot signal of the PRU in every subframe, and accumulates the output $Z_{pilot}^{r,u}$ of the correlator when the receive CINR is low, when the detection error of the P-FBCH takes place, or when the frequency offset estimation accuracy should be raised. Herein, the accumulator may reflect the frequency offset change on the time basis using the weighted sum.

In block 515, the P-FBCH correlator determines the correlation value to estimate the frequency offset for the P-FBCH signal including the three distributed 2×6 FMT received from the terminal, and accumulates the output $Z_{PFBCH}^{r,u}$ of the correlator when the receive CINR is low, when the detection error of the P-FBCH takes place, or when the frequency offset estimation accuracy should be raised. Herein, the accumulator may reflect the frequency offset change on the time basis using the weighted sum.

In blocks 530 and 535, the phase determiner determines and outputs the phase of the accumulated value of the accumulators.

In block 540, the merger performs the frequency offset estimation. Herein, the phase calculation using the pilot signal is updated in every subframe and is relatively more accurate than using the P-FBCH, whereas its frequency offset estimation range is limited. Hence, the frequency offset is corrected by determining whether it exceeds the estimation range using the phase acquired from the P-FBCH.

Figure 6:
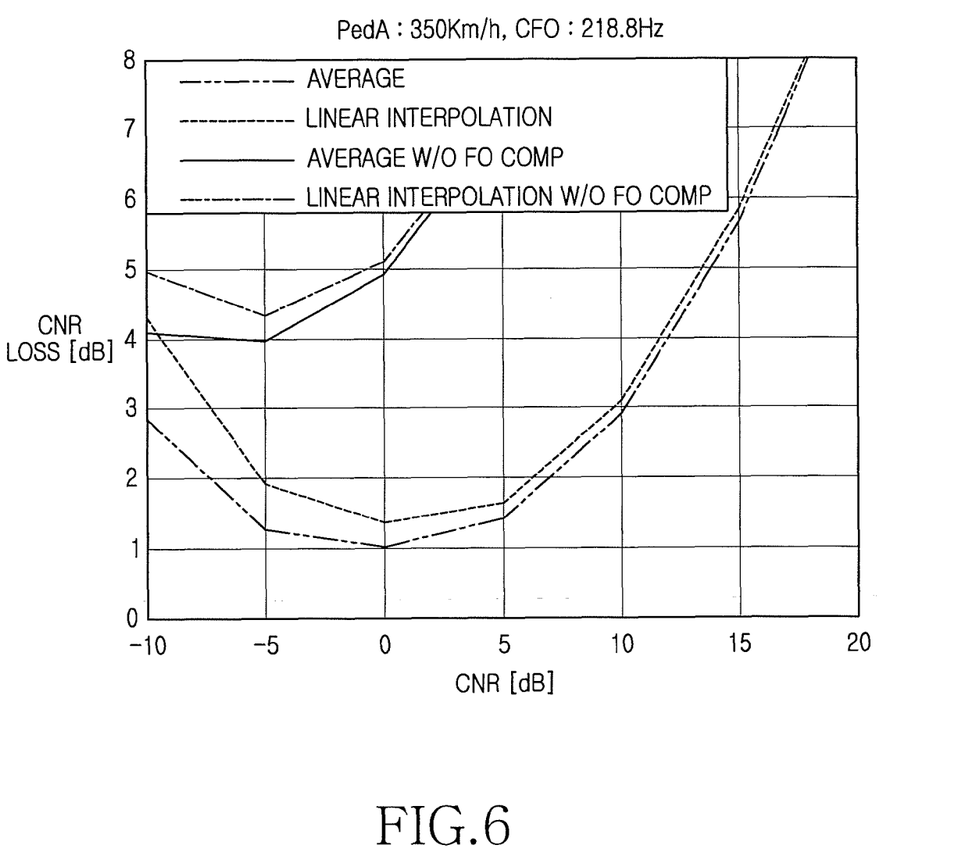
FIG. 6 illustrates a performance graph of the frequency offset estimation according to an embodiment of the present invention.

FIG. 6 is a graph of the performance of the frequency offset estimation according to an embodiment of the present invention.

In FIG. 6, only the pilot tones of the PRU are used and a Channel Quality Indicator (CQI) is transmitted in every four frames over the P-FBCH. The Carrier Frequency Offset (CFO) is 218.8 Hz, the speed of the terminal is 350 Km/h, and the channel model is ITU-R M. 1225, PedB model.

The solid line in FIG. 6 indicates the CNR loss of the channel estimation value after the frequency offset estimation and correction. The notable performance enhancement is exhibited, compared to no correction of the frequency estimation value as indicated by the dotted line. The W/O FO comp in FIG. 6 denotes without Frequency Offset compensation. As set forth above, the frequency offset estimated using the pilot signal is corrected by determining whether, and if any, which way the frequency offset of the pilot signal exceeds the estimation range using the P-FBCH. Therefore, the channel estimation error may be reduced and the modem performance may be improved.

Although the present disclosure has been described with embodiments, various changes and modifications may be suggested to one skilled in the art. It is intended that the present disclosure encompass such changes and modifications as fall within the scope of the appended claims.

What is claimed is:

1. A method for estimating a frequency offset of a receiver in a mobile communication system, the method comprising:
receiving, from a transmitter, a pilot signal and a signal of a control channel;
estimating a frequency offset of the pilot signal and a frequency offset of the control channel; and
correcting the frequency offset of the pilot signal based on the estimated frequency offset of the control channel, wherein correcting the frequency offset of the pilot signal based on the estimated frequency offset of the control channel comprises correcting the frequency offset of the pilot signal to make the frequency offset of the pilot signal more similar to the estimated frequency offset of the control channel.

2. The method of claim 1, wherein estimating the frequency offset of the pilot signal comprises:
accumulating a correlation value of the pilot signal; and
determining a phase based on the accumulated correlation value of the pilot signal.

3. The method of claim 2, wherein accumulating the correlation value of the pilot signal comprises:
applying a weight to each correlation value to reflect change of the correlation value of the pilot signal on a time basis.

4. The method of claim 1, wherein estimating the frequency offset of the control channel comprises:
accumulating the correlation value of a control channel signal; and
determining a phase based on the accumulated correlation value of the control channel signal.

5. The method of claim 4, wherein accumulating the correlation value of the control channel signal comprises:
applying a weight to each correlation value to reflect change of the correlation value of the control channel signal on a time basis.

6. The method of claim 1, wherein correcting the frequency offset of the pilot signal based on the estimated frequency offset of the control channel comprises:
determining whether the frequency offset of the pilot signal exceeds an estimation range, based on the frequency estimated frequency offset of the control channel; and
when the frequency offset of the pilot signal exceeds the estimation range, correcting the frequency offset of the pilot signal based on the estimated frequency offset of the control channel.

7. The method of claim 3, wherein the weight is determined at least partially based on a traveling speed of the portable terminal.

8. An apparatus of a receiver for estimating a frequency offset in a mobile communication system, the apparatus comprising:
a reception circuit configured to receive, from a transmitter, a pilot signal and a signal of a control channel;
a pilot signal phase determiner configured to estimate a frequency offset of the pilot signal;
a control channel phase determiner configured to estimate a frequency offset of the control channel; and
a merger configured to correct the frequency offset of the pilot signal based on the estimated frequency offset of the control channel, wherein, when correcting the frequency offset of the pilot signal based on the estimated frequency offset of the control channel, the merger is further configured to correct the frequency offset of the pilot signal to make the frequency offset of the pilot signal most similar to the estimated frequency offset of the control channel.

9. The apparatus of claim 8, further comprising:
a pilot signal correlator configured to calculate a correlation value of the pilot signal; and
a pilot signal accumulator configured to accumulate the correlation value of the pilot signal output from the pilot signal correlator,
wherein the pilot signal phase determiner is further configured to determine a phase based on the accumulated correlation value of the pilot signal.

10. The apparatus of claim 9, wherein, when accumulating the correlation value of the pilot signal, the pilot signal accumulator is further configured to accumulate the correlation value of the pilot signal by applying a weight to each correlation value of the pilot signal to reflect change of the correlation value of the pilot signal on a time basis.

11. The apparatus of claim 8, further comprising:
a control channel correlator configured to calculate a correlation value of a control channel signal; and
a control channel accumulator configured to accumulate the correlation value of the control channel signal output from the control channel correlator,
wherein the control channel phase determiner is further configured to determine a phase based on the accumulated correlation value of the control channel signal.

12. The apparatus of claim 11, wherein, when accumulating the correlation value of the control channel signal, the control channel accumulator is further configured to accumulate the correlation value of the control channel signal by applying a weight to each correlation value of the control channel signal to reflect change of the correlation value of the control channel signal on a time basis.

13. The apparatus of claim 8, wherein, when correcting the frequency offset of the pilot signal based on the estimated frequency offset of the control channel, the merger is further configured to determine whether the frequency offset of the pilot signal exceeds an estimation range, based on the frequency offset of the control channel, and correct the frequency offset of the pilot signal based on the estimated frequency offset of the control channel when the frequency offset of the pilot signal exceeds the estimation range.

14. The method of claim 10, wherein the weight is determined at least partially based on a traveling speed of the portable terminal.

15. An apparatus of a receiver for estimating a frequency offset in a mobile communication system, the apparatus comprising:
a receiver circuit configured to receive a pilot signal and a signal of a control channel;
a phase determiner configured to estimate frequency offsets of the pilot signal and the control channel; and
a merger configured to correct the frequency offset of the pilot signal based on the frequency offset estimation of the control channel, wherein, when correcting the frequency offset of the pilot signal based on the frequency offset estimation of the control channel, the merger is further configured to correct the frequency offset of the pilot signal to make the frequency offset of the pilot signal more similar to the frequency offset estimation of the control channel.

16. The apparatus of claim 15, further comprising:
a correlator configured to calculate a correlation value of the pilot signal, and calculate a correlation value of a control channel signal; and
an accumulator configured to accumulate the correlation value of the pilot signal, and accumulate the correlation value of the control channel signal output from the correlator,
wherein the phase determiner is further configured to determine a pilot phase based on the accumulated correlation value of the pilot signal, and determine a control phase based on the accumulated correlation value of the control channel signal.

17. The apparatus of claim 16, wherein when accumulating the correlation value of the pilot signal, the accumulator is further configured to accumulate the correlation value of the pilot signal by applying a weight to each correlation value of the pilot signal to reflect change of the correlation value of the pilot signal on a time basis.

18. The apparatus of claim 16, wherein when accumulating the correlation value of the control channel signal, the accumulator is further configured to accumulate the correlation value of the control channel signal by applying a weight to each correlation value of the control channel signal to reflect change of the correlation value of the control channel signal on a time basis.

19. The apparatus of claim 15, wherein, when correcting the frequency offset of the pilot signal based on the frequency offset estimation of the control channel, the merger is further configured to determine whether the frequency offset of the pilot signal exceeds an estimation range, based on the frequency offset of the control channel, and correct the frequency offset of the pilot signal based on the frequency offset estimation of the control channel when the frequency offset of the pilot signal exceeds the estimation range.

20. The method of claim 17, wherein the weight is determined at least partially based on a traveling speed of the portable terminal.

* * * * *